April 11, 1972    A. H. ROBERTS    3,655,861
METHOD FOR THE MANUFACTURE OF MOLDED SOLID PLASTICS ARTICLES
Filed Nov. 29, 1968
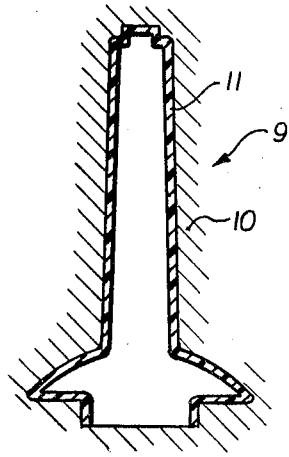
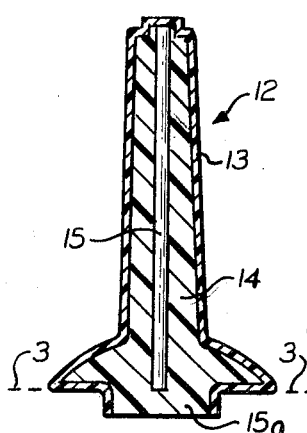
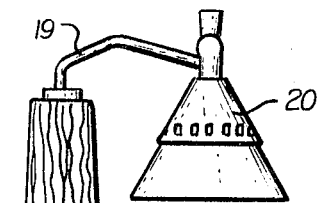
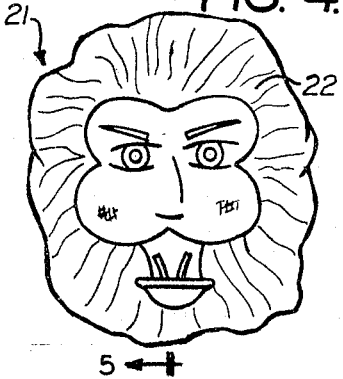
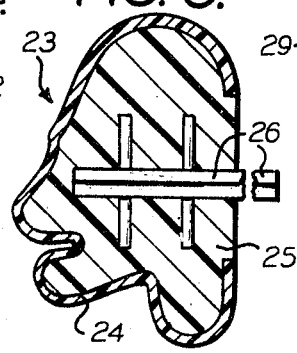
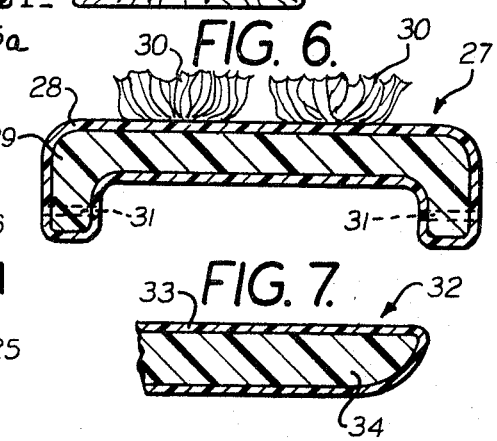
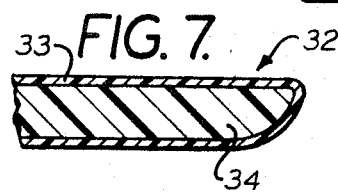
INVENTOR
ARTHUR H. ROBERTS
BY LASZLO AUER
AGENT.

United States Patent Office 3,655,861
Patented Apr. 11, 1972

3,655,861
METHOD FOR THE MANUFACTURE OF MOLDED SOLID PLASTICS ARTICLES
Arthur H. Roberts, 12 Lynwood Drive, Westbury, N.Y. 11590
Continuation-in-part of application Ser. No. 475,989, July 30, 1965. This application Nov. 29, 1968, Ser. No. 779,837
The portion of the term of the patent subsequent to Oct. 7, 1985, has been disclaimed
Int. Cl. B29c 13/04
U.S. Cl. 264—250
18 Claims

ABSTRACT OF THE DISCLOSURE

This invention relates to the preparation of composite articles of manufacture and to the articles so produced. The articles are impact-resistant, three-dimensional and rigid. The articles are comprised of two essential elements: (1) A pliable, hollow premolded outer plastics layer and (2) an essentially rigid non-cellular organic plastics structural backing member solidified in the hollow interior of the plastics skin, and essentially solidly filling said hollow interior. The hollow outer layer is prepared in a manner to have an access opening to its hollow interior. A liquid plastics composition is next prepared in a separate step that comprises an organic binder which solidifies at room temperature, in most cases by converting to a thermoset stage. This liquid composition is then introduced through the access opening into the cavity of the premolded outer layer. The liquid composition is then solidified in a manner to fill essentially voidlessly and fully the cavity of the outer layer, thus producing a dense tough integral article of manufacture having the shape of the premolded outer layer. Illustrative for the outer layer materials are plasticized polyvinylchloride compositions, polyethylene and rubbers. Illustrative for the interior component are epoxy resins, polyester resins, room temperature curing phenolics and filler containing polysulfide rubber, repolymerized depolymerized rubber and polyurethanes. Fillers may be present in the liquid compositions. By the favored method decorative and utilitarian articles with complicated undercuts can be prepared in a simple and economic manner.

CROSS REFERENCES TO RELATED APPLICATIONS

This application is a continuation-in-part of my co-pending application Serial No. 475,989, filed July 30, 1965 for "Molded Hollow Articles of Manufacture and Process for Their Preparation," now Pat. 3,414,456, Ser. No. 523,778, filed Jan. 28, 1966 for "Molded Articles of Manufacture Reinforced With Rigid Cellular Plastics and Process for Their Manufacture," now Pat. 3,419,455, Ser. No. 525,667, filed Feb. 7, 1966 for "Molded Hollow Plastics Articles of Manufacture Rigidified With Rigid Resinous Compositions and Process for Their Manufacture," now patent 3,420,729, Ser. No. 526,605, filed Feb. 10, 1966 for "Rigid Plastics Tile With Textured Surfaces and Method of Manufacture" and Ser. No. 764,272, filed Oct. 1, 1968 for "Molded Plastics Articles With Interiors Solidly Filled and Method of Their Manufacture." These, with the exception of the last mentioned one, were co-pending with and are continuations-in-part of my application Ser. No. 22,002, filed Apr. 13, 1960 for "Method and Means for Manufacturing Various Articles and Articles Produced Thereby," since abandoned and all of the listed applications were co-pending with and continuations-in-part of my application Ser. No. 455,764, filed May 14, 1965 for "Impact Resistant Article and Method of Manufacture" now Pat. 3,405,026.

BACKGROUND OF THE INVENTION

(1) Field of invention

The field of this invention is that of molded articles of manufacture. Many of these articles were made earlier from ceramics or plaster of Paris. These prior art articles are fragile. Others were made of solid plastics, like plastisols. Besides being expensive these all-plastics articles show the drawbacks of sensitivity to heat, heat distortion and cold flow at ambient temperatures. Other such articles were made of metal which causes noise when touching other metal parts and which are either expensive or complicated to manufacture with undercut type decorative effects.

(2) Prior art

Whereas the broadest claims of my Pat. 3,405,026 read on solidly filled articles, as originally filed, the scope of the claims therein are now limited to hollow articles of manufacture. This means that the skin component and the rigidifier jointly form a cavity, which does not apply to the instant application. Ser. No. 523,778 teaches articles of manufacture wherein the hollow interior of the skin component is filled with cellular compositions. The nature of the instant invention, wherein the rigidifier is non-cellular, is obviously different from the articles having cellular rigidifiers. The utility of the articles varies from each other also. Pat. 3,414,456 and application Ser. No. 525,667, now Pat. 3,420,729, deal with hollow articles. Application Serial No. 764,272, filed Oct. 1, 1968 deals with solidly filled molded articles wherein the interior structural backing member is a cement. The binders used in the instant application are organic thermosetting plastics including elastomers.

Canadian Pat. 557,617, Schneider, describes a shoe last. The outer shell component is a plastisol type. The shell is hollow and the interior is filled in a certain manner with a cellulose acetobutyrate composition. The described composition is, however, softish, flexible and resilient, instead of being rigid.

SUMMARY DESCRIPTION OF THE INVENTION

According to the process of this invention:
In the first step a hollow plastics outer layer of the desired shape is molded in such a manner that it has an access opening. The plastics material forming the outer layer is flexible.

In the second step a liquid composition is prepared from an organic binder which can solidify at room temperature.

In the third step the liquid composition prepared in the second step is introduced through the access opening into the cavity of the outer layer in a way to substantially fully fill the said cavity.

In the fourth step the liquid composition prepared in the second step and introduced into the outer layer's cavity in the third step is solidified, into an essentially voidless structural backing member, thereby producing a dense tough integral article of manufacture having the shape of the premolded outer layer.

The articles of manufacture so produced, therefore, have two components. The outer component is a pliable, hollow, plastics outer layer, which can also be called the "skin" or "shell." The inner component is a dense, non-cellular plastics structural backing member having an organic binder which is solidified from a liquid state in the hollow interior of the plastics skin at ambient temperatures. The structural backing member essentially fills the hollow interior of the premolded plastics skin. The combination of the two components produces practically rigid articles of manufacture.

The skin is preset in its shape by a molding operation. It is formed from a plastic material, which is preferably pliable and resilient. Depending on the plastic material selected to form the skin, the molding operations may vary, in order to utilize the most advantageous method for the selected plastic. The outer surface of the skin readily receives coloring materials for decorating the composite article. The inner walls of the skin define an internal cavity accessible through an opening in the skin. The rigidifier component is in intimate contact with the inner walls of the preset skin and is in supporting relationship to the outer layer "skin." The rigidifier fills at least the major part of the interior cavity of the skin. The preferred backing member components are compositions comprising rigid epoxy resins, rigid polyester resins, room temperature setting phenolic resins, polyurethane rubber, polysulfide rubber and polymerized depolymerized rubber compositions. All the binders used in the instant invention have the common characteristic of solidifying from a liquid at ambient temperatures to a solid state. This solidification can be classified in most cases as a thermosetting process and the binders in the completed articles are in a thermoset stage. The thermosetting process includes vulcanization and polymerization processes. In the case of binders which after thermosetting remain somewhat elastic or rubbery, fillers may be incorporated to increase the rigidity of the structural backing member composition. Fillers, however, can be used also with the resins which form hard and rigid backing members.

In most cases the premolded outer layer, after removal from its mold, requires no second mold while the backing member component is produced. This means that the premolded outer layer can act as a mold during the formation of the backing member. If a second mold is used, a split mold is of advantage. After solidification of the backing member, the articles become rigid and in most cases could not be removed from one-piece molds.

The skin component of the composite article of manufacture has a preferred wall thickness of about 1/64 of an inch to about 1/4 of an inch. Expressed in thousandths of an inch, this corresponds to a range of from about 15.625 mils to about 250 mils. The lower figure may be rounded to be 15 mils.

In one of the embodiments of this invention the rigidifier may be strengthened by a reinforcing spine component. The spine, where applied, is a third component and it may be used either within the entirety of the rigidifier or only in portions thereof.

Skin component

Plastisols illustrate an eminently suitable material to form the skin component of the articles of manufacture of this invention. They will be discussed further below in describing the preferred embodiment.

For the purposes of this invention it is meant that the skin materials are flexible, pliable and resilient in a relative manner in comparison with the rigidifier component of the articles of manufacture. The composite article itself is rigid and is resistant to impact. The rigidifier component rigidifies the flexible skins and improves resistance to cold flow or heat distortion. The skin materials on the other hand protect the rigidifier component from impact. The mutual improving effect between skin and rigidifier is unexpected and surprising and the effect obtained is in many cases synergistic. As a measure for flexibility or pliability I use hand pressure. If a skin material at 15 mils thickness can be deformed at least temporarily by hand pressure, the material is considered flexible and pliable.

Polyolefins, such as polyethylene and polypropylene are other illustrative examples for the production of the skin component of this invention. Polyethylene is made today of varying properties with the low pressure and high pressure polymerization processes. It is supplied with varying densities, molecular weights, flexibility and other characteristics. The types of polyethylene most suitable for this invention are pliable, flexible and show some degree of elasticity. Polyethylene is preferred in this invention over polypropylene since it is more easily formed into pliable and flexible skins. Polyethylene copolymers, such as ethylene-vinylacetate and ethylene-ethyl acrylate copolymers, offer improved flexibility and resilience. They are rubberlike and similar to elastomeric plastics. For the production of skins from polyethylene and polypropylene seamless dies are not satisfactory and two-piece dies are preferred, using blow molding or other methods. Polyallomers belong to this class of materials, as they are copolymers of ethylene and propylene.

The skin portion of the articles of manufacture of this invention may be formed of other materials such as vulcanized natural rubber or synthetic rubber. The skins may be formed according to known procedures of rubber technology. One of the methods useful in preparing skins from rubber is to use latex molding (latex casting) compounds, utilizing plaster of paris molds. The Vanderbilt News, vol. 27, No. 4, December 1961, p. 72, deals with latex compounding which can be used to make skins for articles according to the present invention.

Recently a thermoplastic rubber type has been introduced on the market which comprises block copolymers of styrene and butadiene. Like all thermoplastics, they form free-flowing melts when subjected to heat and pressure, and on cooling, they harden to give articles conforming to the mold or die shape. The products are marketed under the trademark of Thermoplastic® rubbers by Shell Chemical Company. They can be molded by methods known for thermoplastics, like by injection molding etc. After hardening the resulting products have physical properties which are essentially indistinguishable from vulcanized elastomers. Full tensile strength is achieved immediately after the molded part cools. These rubbers are also suitable to form the outer layer component of this invention.

Thermoplastic plastics are preferred as materials for the outer layer (skin)component.

Other suitable plastic materials to form the skins of this invention are illustrated by methyl methacrylate polymer, ethyl cellulose, polycarbonates, polyurethane elastomers, flexible epoxy compounds, amongst others. Illustrative examples are given in my Pat. 3,414,456. (Ser. No. 475,989.)

The preset molded skins can be prepared by various molding processes. The selected process depends on the selected plastic material and on the shape and size of the skin to be molded. For illustrative purposes a few examples are given. Casting, such as slush casting or rotational casting: plastisol, flexible polyester, flexible epoxy resins, methyl methacrylate, polycarbonates from solution, rubber from latex, etc. Injection molding or extrustion: plastisol, polycarbonates, ethyl cellulose, polyethylene, cellulose acetate, cellulose acetobutyrate, etc. Vacuum forming: polyethylene, polycarbonates, polyallomers, etc. Blow molding: polycarbonates, polyethylene, polyallomers, ethyl cellulose, cellulose acetate, etc. Hot melt process: ethyl cellulose, plastisol or other plasticized polyvinyl chloride compositions, polyethylene, etc.

Whether a one-piece, two-piece or multi-piece mold is required, depends on the selected skin material and, to some extent on the shape of the manufactured article. The molding process also influences the mold selection. Plastisol illustrates a skin forming material which permits the use of one-piece molds even if the skin has many undercuts in its shape. Methyl methacrylate illustrates a material which requires at least two-piece molds in most instances. Blow molding and vacuum forming are usually carried out in two-piece or multi-piece molds. One-piece molds form seamless molded shapes. Two-piece molds cause, in most cases, some seam formation. It may be necessary to eliminate these seams. Therefore, seamless molding is of advantage.

From the skin materials discussed above, polyethylene and polycarbonates, when blow molded, are used at a limited thickness.

Structural backing member component

The structural backing member components of this invention comprise an organic binder which is capable of solidifying at ambient temperatures into a rigid or dense state. The liquid compositions contain proper additives, such as catalysts, sensitizers, vulcanizing agents, antioxidants and other additives required for their transformation. The ones which set to a hard and rigid mass by themselves may or may not contain fillers. Elastomeric materials which otherwise would solidify to an elastic mass instead of a rigid or dense mass, require the addition of fillers. Such fillers may be present in as high a percentage as 50% to 90% of the total composition, providing the fillers are large particle size such as a 60 mesh sand. The liquid compositions are in most cases free of volatile components which would evaporate during solidification.

The absence of volatile materials (whereas not an absolute necessity), eliminates the danger of shrinkage, or at least reduces such shrinkage.

Polyester resins and epoxy resins are favored types for the binder portion of the structural backing member component of this invention. They are described in greater detail in my copending application Ser. No. 525,667, now Pat. 3,420,729.

Polyester resins are usually made in two steps. In the first step a condensation and esterification reaction occurs between a dibasic acid and a diol. In the second step the product of the condensation reaction is blended with a vinyl monomer. The dibasic acids can be unsaturated or saturated. Unsaturated dibasic acids are illustrated by maleic anhydride, fumaric acid and itaconic acid. Saturated dibasic acids are illustrated by phthalic anhydride and isophthalic acid. In most cases, mixtures of unsaturated and saturated dibasic acids are used to secure desired modifications. The diols are glycols. The useful glycols form a long list well known in the art. Propylene glycol, ethylene glycol, diethylene glycol and dipropylene glycol are illustrative examples. Neopentyl glycol is another example. Styrene is the most frequently used crosslinking vinyl monomer. Vinyl toluene is another example. The condensation products of dibasic acids and diols yield linear long chain polymers. The vinyl monomers cause the desired crosslinking.

The unsaturated dibasic acids are essential ingredients. Their condensation products with diols have limited compatibility with the monomer, too high a reactivity, and/or relatively poor general physical and strength properties. It is therefore common practice in most resin formulations to use an aromatic dibasic acid along with the unsaturated acid in order to modify these properties and improve on the general utility of the product. The aromatic dibasic acid in the polyester formulation adds compatibility, controlled reactivity, hardness, chemical resistance and strength. Isophthalic acid is finding increased usage in high impact resilient or flexible polyesters. Flexibility and/or resiliency may be enhanced by incorporation in the acid component of some adipic acid, sebacic acid, azelaic acid and dimer vegetable oil acids, amongst others. Other dibasic acid supplying components are illustrated by tetrahydrophthalic anhydride, Chlorendic or Het acid or anhydride, tetrachlorophthalic anhydride, tetrabromophthalic anhydride. The halogenated acids decrease flammability. Flexible polyesters usually contain long chain acids or glycols, or both. Propylene glycol yields rigid resins. Diethylene glycol is used widely in polyesters of the high impact, resilient and flexible types. Higher polyether glycols like triethylene glycol and tripropylene glycol or still higher homologs, are sometimes used to increase flexibility, but at the expense of resistance to heat, water and weather. 1,6-hexanediol and 1,3-butylene glycol contribute to flexibility. Many other diols and their specific properties in polyester formulations are known in the art.

Monomer content ranges from 25% to 50% by weight. The remainder is the ester polymer of the dibasic acids and diols. 40% styrene content is a good illustration of a useful proportion. Specialty monomer effects can be obtained, for instance, with diallyl phthalate, diallyl isophthalate, triallylcyanurate and methyl methacrylate monomers. Chlorostyrene is another example.

Linear, long chain components impart flexibility. Aromatic rings or other cyclic configurations, by contrast, contribute rigidity and hardness. Increasing the flexibility of the molecule normally tends to decrease the resistance to chemicals, solvents, heat and weather. The ultimate formulation decision is generally based on proper balance of properties required and may be influenced by cost considerations also. Flexibility, for example, can be achieved in a number of ways, illustrated by increasing the proportion of flexibilizing glycol or flexibilizing dibasic acid, decreasing the proportion of maleic anhydride or fumaric acid, etc. The opposite applies to increase rigidity.

Polyester resins are supplied with some inhibitor content. Organic peroxides are useful crosslinking agents and cobalt is an illustration of a crosslinking assistant. A suitable additive to regulate viscosity is a submicroscopic pyrogenic silica prepared in a hot gaseous environment, marketed by Cabot Corporation under the tradename of Cab-O-Sil. Other compounding ingredients, known in the art, may also be incorporated.

Polyesters are classified as "rigid" or "flexible," etc. Since the degree of stiffness in bending (i.e. flexural modulus) is the characteristic most frequently associated with rigidity or flexibility, the following generalized classifications are suggested as a means of identification by Modern Plastics Encyclopedia, 1966 (published September 1965/vol. 43, No. 1A) on page 291:

|  | Modulus of elasticity in flexure, p.s.i. |
|---|---|
| Rigid polyesters | $5-6 \times 10^5$. |
| High impact or semi rigid | $3-5 \times 10^5$. |
| Semi-flexible polyesters | $1-3 \times 10^5$. |
| Flexible polyesters | Less than $1 \times 10^5$. |

The modulus spectrum is continuous and the divisions in the above groups are arbitrary, but they are useful as a guide. The most rigid polyesters have tensile elongations at break of 1 to 2%; flexible unsaturated polyesters with as high an elongation as 200% can also be made. As flexibility increases while the styrene content is kept constant, the viscosity decreases, the hardness decreases, heat distortion temperature and heat resistance decrease, impact strength increases, flexural strength decreases and water and chemical resistance generally decrease. The opposite is true when the rigidity increases.

Example P–E–2 and Example P–E–3, of Ser. No. 525,667, now Pat. 3,420,729, are illustrative for useful polyesters suitable for the structural backing member component of this invention.

Epoxy resins are characterized by the presence of epoxy groupings. They are well known in the art. Reference is made to Modern Plastics Encyclopedia 1966, referred to above, pp. 165 to 169. One of the commercially available types is made by condensation of bisphenol A with epichlorhydrin. Generally 2 mols of epichlorhydrin are reacted with 1 mol of bisphenol A. Polymerization may occur during the condensation reaction in varying degree. All of these resins have epoxide groupings in the two end positions in a linearly written formula. The polymerized center positions show ether linkages and hydroxyl groupings, both formed by the epoxy grouping of the epichlorhydrin. If we consider the number of the linkages converted to ether-hydroxyl groupings as $n$, one can visualize that $n$ can be equal to zero or more. The resins containing $n=0-1$ are liquid and are preferred for the purposes of this invention. The types where $n$ is higher than 1 become gradually more solid and brittle and are more suitable for esterification reactions, for instance, with fatty acids for coating material purposes. A few Epon resins are listed here for illustrative purposes. Epon is a registered trademark of Shell Chemical Company. Epon Resin 828 is designed in theory to give $n=0$, but in practice its $n$ content is between 0 and 1. Its epoxide equivalent is 185 to 192. Epon Resin 830 is similar to Epon Resin 828, but its $n$ is slightly nearer to 1 than with the 828 type. This indicates the presence of some higher homologues. Its epoxide equivalent is 190 to 210. Epon Resin 834 is formulated in theory to have $n=1$, but in practice its $n$ is between 1 and 2. This is also indicated by the epoxide equivalent of 230 to 280 for this resin. All 3 of these resins are liquid at room temperature.

Another type of epoxy resins is the group of low-viscosity, liquid, aliphatic polyepoxides. They are prepared by the oxidation of olefins with peracetic acid. Other examples of epoxy resins are cycloaliphatic epoxy resins and epoxidized fatty oils and fatty acid esters. Epon Resin 871 is an illustration of liquid aliphatic polyepoxides with an epoxide equivalent of 390 to 470. It is compatible with Epon Resin 828 in all proportions and is suitable to increase the flexibility of the latter. The list herein given is illustrative and does not limit the scope of suitable epoxy resins.

The selection of a curing agent or hardener for epoxy resins depends on the application. Factors considered in selection of the hardener include: (1) viscosity; (2) pot life; (3) curing cycle; (4) end-use property requirements; and (5) environmental conditions expected in the end-use. The curing agents fall into the broad categories of (a) amines, (b) acids and anhydrides and (c) catalysts and latent hardeners. Suitable curing agents include DTA (diethylenetriamine, also called DETA), AEP (N-aminoethylpiperazine), TETA (Triethylenetetramine), NMA (NADIC Methyl Anhydride), AA (adipic anhydride), DDSA (dodecenylsuccinic anhydride). Catalysts include borontrifluoridemonoethylamine, dicyandiamide and benzyldimethylamine.

Flexibility and rigidity is regulated, for example, by the percentual proportion of bisphenol-A comprising rigid epoxy resins and of the flexible liquid aliphatic polyepoxide. Epoxidized fatty acid esters may also be used as flexibilizing additives.

Epoxy plasticizers include epoxy compounds of fatty oils and their acids. Epoxy novolac resins and cycloaliphatic epoxy resins are other illustrative members of the epoxy resin group. Polyamides and acid anhydrides may also be used as curing agents.

Example E-R-(ii) described in my application Ser. No. 525,667 (Pat. 3,420,729) is a suitable illustration.

A few more data can be mentioned to assist in formulating rigid or flexible epoxy resin compositions. Blends of Epon Resin 871 and Epon Resin 828 cure at room temperature with certain polyamines, such as with DTA and AEP. They require elevated temperatures for curing with other curing agents. A limit of 10% elongation at break is a reasonable top limit to characterize rigid epoxy resins. Using elevated curing temperatures to secure curing with diversified curing agents, the following facts can be cited: (1) 60% 871 and 40% 828 resin blend, using a curing schedule of 4 hours at 125% C. yields with 7.4 phr. (parts per hundred resin) of diethylenetriamine 4240 p.s.i. tensile strength at break and 6% elongation; a 40%:60% blend of the same resins, with the same curing agent at 8.4 phr. yields 5680 p.s.i. tensile strength at break and 2% elongation. (2) A 40% 871 and 60% 828 resin blend at a cure of 4 hours at 125° C., using 18 PHR N-aminoethylpiperazine yields 8840 p.s.i. tensile strength at break and 9% elongation. (3) A 60% 871 and 40% 828 resin blend, using a cure schedule of 2 hours at 80° C.+3 hours at 150° C. and 14.5 phr. Epon Curing Agent Z (a proprietary aromatic amine), yields 6770 p.s.i. tensile strength at break and 13% elongation; whereas a 40% 871 and 60% 828 blend, using the same curing schedule and 16.3 phr. of the same curing, yields 9540 p.s.i. tensile strength at break and 5% elongation. (4) In a standard blend of the two resins using AEP as curing agent the room temperature cure took 7 days at 25° C. and 4 hours at 125° C., yielding comparable tensile strength at break of 3760 and 3600 respectively. The blend used was 67% 871 and 33% 828.

Epon Resin 828 yields, with numerous other types of flexibilizers, rigid epoxy resin compositions. Examples are (a) long-chain reactive polysulfides (Thiokol liquid polymers), (b) amine-terminated polyamides (Versamid resins), (c) epoxy terminated natural oils (Cardolite) and (d) certain fatty acids (Emery Polymerized Fatty Acid 3162 of Emery Industries, Inc.) The Thiokols are marketed by Thiokol Corporation, the Versamid resins by General Mills Corporation, The Cardolites by Irvington Varnish Division, Minnesota Mining & Manufacturing Company. They yield in mixtures ranging from 70 to 90% Epon Resin 828 and flexibilizer ranging from 30 to 10%, using Epon Curing Agent Z, cured 1 hour at 90° C. +2 hours at 177° C. tensile strength values at break of from about 9,000 p.s.i. to about 12,500 p.s.i. and elongations ranging from about 3.0% to about 5.5%. These data are given for illustrative purposes only. Room temperature cures are preferred in the instant invention. Excessive curing temperatures may cause distortion of many of the outer shell components, whether reinforcing second mold is used or not during the formation of the structural backing member component.

Another suitable binder for the structural backing member component is the group of room temperature curing phenol formaldehyde resins. These have been originally developed for wood finishing purposes and are characterized by a larger proportion of aldehyde to phenol as otherwise used with commercial phenolic resins. They are applied with acid catalysts and do not have long pot-stability. This means that the catalysts have to be mixed with the resin shortly before it is used.

Such suitable resins are illustrated by those described in Pat. 2,114,784 to Maisch et al. The hardenable phenol-formaldehyde resin is obtained by condensing in an alkaline environment one mol of phenol with 1.5 mols or more of formaldehyde. The resulting resin hardens with acid catalysts between room temperature and 80° C. Acidic catalysts are used in the final conversion. In its Example 1, dimethylamine is used as catalyst during the condensation reaction.

Another group of organic binders suitable for this invention is represented by liquid compositions convertible at room temperature to elastomeric polymerized or vulcanized solids. To suit the purposes of this invention these elastomeric binders advantageously require the presence of fillers to obtain the proper rigidity. These binders are illustrated by depolymerized rubber, polysulfide rubbers and flexible room temperature curing polyurethane resins.

Depolymerized rubber is marketed, e.g., by H. V. Hardman Co., Inc., Belleville, N.J. under the trade name of DPR Flowable Rubber (Depolymerized). DPR® is a trademark. The company markets the product in two parts: Part A and Part B. Part A contains 100 parts of depolymerized rubber, 5 parts of paraquinonedioxime and 100 parts of Atomite. All parts here and elsewhere in this specification are parts by weight. Atomite is a calcium carbonate. Part B is a dispersion of about 10 to 20% of lead peroxide in 90 to 80% of dioctylphthalate.

I have prepared a composition according to the following formula:

| | Parts |
|---|---|
| DPR Compound #242 Part A | 100 |
| DPR Compound #242 Part B | 8 |
| 60 Mesh sand | 100 |

The mixture could be made with ease, when using the proper equipment for mixing. It had a high viscosity at the start of the mixing. The mixture had a curing time at room temperature of about 16 hours. It could be cast without difficulty into a premolded plastisol shell through its cavity and was self-leveling. After solidification it set to a tough mass and yielded a dense and tough end-product in combination with a shell.

Polysulfide rubbers are mostly known in the art as Thiokol® rubbers. Thiokol LP–3 and LP–33 polysulfide polymers are liquid and illustrate compositions suitable to be applied by casting. They are of low molecular weight and differ from each other only in the degree of crosslinking which occurs during polymerization. LP–33 is crosslinked to a smaller extent than LP–3. Both of these polysulfide polymers are composed of repeating formal groups linked by sulfur-to-sulfur bonds and terminated by mercaptan groups. Additional mercaptan groups occur at intervals on the chain of repeating formal groups which provide crosslinkages at various points.

Thiokol LP–33 and LP–3 polysulfide liquid polymers are converted to the solid, rubbery state by means of curing agents which react with the mercaptan terminals and side groups of the liquid polymer segments. These reactions may occur by oxidation, addition or condensation and result in the formation of sulfide bonds. The reactions are somewhat exothermic and are accelerated by an alkaline environment. Room temperature cures use tellurium dioxide and manganese dioxide, amongst others. Tellurium dioxide is used in proportions of 10 to 15 parts per 100 parts of polysulfide liquid polymer. The addition of 0.5 part of sulfur or 5 to 10 parts of sodium stearate accelerates the curing. This may take 24 hours at room temperature. Manganese dioxide is used in proportions of 2 to 6 parts per 100 parts of liquid polymer. Its curing reaction can be accelerated by the addition of 1.5 to 4 parts of m-dinitrobenzene. Para-quinone dioxime in combination with dephenylguanidine effects the conversion at elevated temperatures such as about 160° F. Paint dryers can be added to accelerate the reaction, such as cobalt hexogen, manganese hexogen and lead octoate.

Epoxy resins in the presence of a suitable activator co-react with Thiokol LP–3 and LP–33 polysulfide polymers by addition. Aliphatic and aromatic amines are the most common activators. Approximately 10 parts of amine activator are required for 100 parts of epoxy resin. Epoxy resins up to 500 parts can be added per 100 parts of liquid polysulfide polymers.

A medium hard casting compound is represented by the following formulation:

| | Parts |
|---|---|
| Part A: | |
| Polysulfide polymer LP–3 | 100 |
| Tri-dimethylaminomethyl phenol (catalyst for epoxy resin) | 10 |
| Part B: | |
| Epoxy resin with epoxide equivalent | 185–200 |

Mixing ratio A:B=110:100 parts.

The epoxy resin here used had a viscosity of 11,000 to 14,000 cps. at 77° F. The mixing should be thorough and carried out just before application. Inclusion of air bubbles should be avoided. The mixture cures at room temperature.

A hard casting compound is represented by the following formulation:

| | Parts |
|---|---|
| Part A: | |
| Thiokol LP–3 | 100 |
| Tri-dimethylaminomethyl phenol (catalyst for epoxy resin) | 20 |
| Part B: | |
| Epoxy resin * | 200 |

*Epoxide equivalent 180–200; viscosity at 77° F., 9,000–18,000.

Mixing ratio A:B=120:200 parts. Ingredients should be thoroughly mixed immediately prior to use.

An illustration for using fillers is given in the following example:

| | Parts |
|---|---|
| Epon 828 | 15.7 |
| Thiokol LP–8 | 15.7 |
| Epoxide #7 | 3.2 |
| 325 Mesh Silica | 31.9 |
| 60 Mesh Silica | 31.9 |
| Diethylenetriamine | 1.6 |
| | 100.0 |

This formation yields a more rigid backing member than a repeat example carried out in the absence of the fillers (the two silicas). The Thiokol LP–8 is a sister to the products LP–3 and LP–33. The Epoxide #7 is made by Proctor and Gamble.

The chemistry and base materials of polyurethanes is described in great detail in my copending application Ser. No. 523,778, now Pat. 3,419,455, in connection with polyurethane foams. Reference is made thereto. One of the basic differences between the substantially voidless polyurethanes of the instant invention and those of the foams is that the former do not contain water, foam forming additives and do not promote carbon dioxide formation. This is achieved by prepolymer formation or quasi-prepolymer formation. Otherwise the polyisocyantes, the hydroxyl containing polyesters, the polyetherpolyols and the catalysts are of the same type. As the polyurethanes herein used resemble in a certain way polyurethanes used in the coating industry, castor oil reaction products are frequently used.

The favored prepolymers are based on TDI, which is an 80/20 mixture of 2,4 and 2,6 isomers of toylene diisocyanate and on MDI, which is diphenyl methane diisocyanate. Other diisocyanates may also be used. Another of the illustrations is polymethylene polyphenylisocyanate, supplied under the trademark of PAPI by the Upjohn Company. PAPI yields low exotherm one-shot systems for pour-in-place applications. Hexamethylene diiosocyanate and its adducts have also useful properties.

The functionality of polyols, polyether polyols and polyesters governs the flexibility or rigidity of the resulting polyurethane product. Higher hydroxyl numbers indicate shorter chains and yield more rigid end products, whereas lower hydroxyl numbers indicate longer chains and yield more flexible or softer end products.

The rigid systems use less active catalysts. Suitable catalysts are discussed in my copending application Ser. No. 523,778 (Patent 3,419,455). The following may be repeated as illustrative:

Dibutyltin dilaurate.
Triethylenediamine.
N,N,N',N'-tetramethyl-1,3-butanediamine.
Tetramethylbutanediamine.
1,2,4-trimethylpiperazine.
1,1,3,3-tetramethylguanidine.
Triisopropanolamine. (TIPA).
N,N,N',N'-tetrakis (2 - hydroxypropyl)-ethylenediamine, marketed under the trade name of Quadrol by Wyandotte Chemical.

A special category is represented by MOCA, which is 4,4'-methylene-bis(2-chloroaniline). It cures prepolymers at room temperature. It may also take the place of additional polyol component.

Solithane 113, marketed by Thiokol Chemical Corporation, illustrates a polyurethane prepolymer suitable to form the structural backing members of this invention. It is based on castor oil as hydroxyl supplying component. Suitable curing agents for Solithane 113 are illustrated by Quadrol, TIPA, MOCA and diethanolamine. Liquid curing agents are preferred. TIPA can be converted to a liquid curing agent by mixing it with triethanolamine in proportions of 50:50. In proper proportion, these curing agents supply rigid polyurethanes at room temperature.

A room temperature curing polyurethane elastomer is illustrated by black polyurethane compound Denflex 9820-A and Denflex 9820-B. The 9820-A is the urethane base and the 9820-B is the urethane adduct. The urethane base is weighed first into the container followed by the urethane adduct on top of the base. The temperature of the base should be brought to 77 to 100° F. before weighing. The two materials are thoroughly mixed with the minimum of air entrapment. The mixing ratio is 8 parts of base (A) to 1 part of aduct (B). To 32.5 parts of the mixture of (A)+(B) 67.5 parts of 60 mesh sand was mixed. The mixture is immediately used and cast into a plasticized polyvinylchloride shell. Gelling time is short. Curing will take place at room temperature, such as 77° F. The Denflex compounds, here mentioned, are marketed by Dennis Chemical Co. of St. Louis, Mo. and were originally designed for molds in molding polyurethane foam. The 9820-A is a mixture of inert filler in a polyether base. The 9820-B is prepolymer of polyether and tolyl diisocyanate.

Instead of 60 mesh sand other types of coarse fillers can be used, such as limestone, varying meshes of silica, sand, etc. If the particle size of the filler is finer, a smaller proportion of filler would yield equivalent results. The filler's action is primarily governed by its total surface area, which in turn relates to the particle size.

More recently, an interesting new group of materials for casting and molding purposes, has been marketed by Ashland Chemical Co. under the trade name of Aropol WEP. They are unsaturated polyester resins ready for the preparation of water-in-oil emulsions. The emulsions are thermosetting and when cured they are white and resemble fine-grained plaster or concrete. Castings containing 50-60% water are recommended for a broad range of applications. The presence of larger proportions of water reduces proportionately the overall strength. The emulsions, being water-in-oil emulsions, increasing the water content increases the emulsion viscosity. Increased quantities of water, strangely enough, produce shrinkage during cure but reduce the permanency of the water held by the end product. The water percentage discussed is based on the total weight in the final casting or the emulsion used for casting. Aropol WEP26 is recommended as most useful resin. Other manufactured numbers vary in viscosity, curing speed and resilience. The WEP26 and WEP27 are resilient or semiflexible whereas WEP41 and WEP42 are more rigid.

WEP composites are cured at room temperature with a methyl ethyl ketone peroxide-hydrogen peroxide blend, promoted with cobalt octoate and dimethylaniline (DMA). Resin emulsions can be made to gel at room temperature within two minutes or less.

The promoter ingredients, such as cobalt octoate and DMA can be added to the resin prior to water addition. The catalyst blend, however, should be added after the water has been incorporated. A suitable catalyst blend consists of hydrogen peroxide (50% grade), water soluble MEK peroxide (Lupersol DEW), and water, in the proportion of 3:1:4. Proper proportions per 100 grams of resin are 1.25 grams of cobalt octoate (12%), 0.50 grams of dimethylaniline, 1.00 gram of the peroxide blend, listed as 3:1:4. These WEP compositions shrink during the curing process. Typical shrink values are 0.5 to 1.4% (linear). They can be used where such shrinkage is not disturbing.

The room temperature thermosetting polymers are preferred as binder resins for the herein claimed process. They have the advantage that in most cases the premolded outer layer component itself can act as a mold in forming the structural backing member component.

In the event that multi-piece molds are used similar effect can be obtained by thermoplastic rigidifiers, such as ethylcellulose, cellulose acetate or slush-molding type polyethylenes. All these thermoplastic materials are preheated and applied by pouring or by injection molding to fill the cavity of the premolded skin, which in turn is present in the protective multi-piece mold to prevent deformation of the skin. After pouring the rigidifier component into the premolded shell, the mold and its contents are cooled to room temperature and the article so produced is removed from the multi-piece mold.

In the context of this application, the expressions "essentially voidless," "substantially voidless," "essentially non-cellular" and "substantially non-cellular" should be construed with the meaning that with the technical skill available, the composition is designed to yield voidless and non-cellular structural backing members. In the event however, by fault of manufacturing procedure, processor, or equipment, some voids may stray into the backing member, this should not exempt the product so obtained from falling under the scope of the respective claims. In a similar manner, the expressions of "essentially solidly filling" or "substantially solidly filling" the cavity of the hollow interior of the premolded skin component should be understood as to fill the hollow cavity practically fully. This means that if by the fault of equipment or processor an unfilled rim is produced in an insignificant degree, without serving a utilitarian necessity, such "incompleteness in filling" again should not exempt the process or product from falling under the scope of the respective claims.

DRAWING

FIG. 1 illustrates object 9 which is a vertical cross-section of a mold with a plastisol skin on the interior surface of the mold. 10 is a seamless mold suitable to form the outer layer for skin component. 11 is the skin component.

FIG. 2 denotes the object 12. This could be a narrow desk lamp or table lamp base, or the pedestal for an end table top or, if turned upside down, a chair leg. FIG. 2 illustrates a vertical cross-section of the object. 13 is the skin component and 14 is the structural backing member such as a polyester resin that is highly filled. 15 is a tube of steel or of plastic that could be permanently set in place by the polymerization of the polyester resin. The tube serves two functions. First, an electrical cord can pass through it from the source of power to the socket. It further reinforces the article of manufacture and this is its second function. 15-A is a collar at the bottom of the piece, which is cut off at line 3—3 after the manufacturing of the object is completed.

FIG. 3 is a desk lamp, object 16. It utilizes the lamp base of FIG. 2 after collar 15-A of FIG. 2 has been removed. The view is a direct front view. 17 shows the surface texture of the skin. 18 is an electrical cord and plug; 19 is a metal tubing extending from the interior of the lamp base; 20 is a lamp shade of metal, glass, plastics, etc.

FIG. 4 is object 21 in front view and illustrates an undercut lion head that can be utilized as a door knob, furniture part or wall decoration. 22 is the undercut decorative surface of the lion's head.

FIG. 5 is 23 which is the section 5—5 taken in FIG. 4. 24 is the skin, 25 is a fairly rigid filled epoxy-polysulfide rubber compound. 26 is the steel door knob hardware used to pass through the lock. Steel arms on hardware are to keep the shaft from rotating in the structural backing member.

FIG. 6 is object 27, which denotes the vertical cross-section of a decorative handle. 28 is the skin. 29 is an elastomeric polyurethane highly filled, 30 shows undercut flowers as decorative portions of the skin 28. 31 designates pivot holes for attaching handle to object to be carried. The skin 28 is filled with liquid composition forming the structural backing member component through one or more of the pivot holes of 31.

FIG. 7 is object 32. This is a section of a tongue for a noiseless door lock. 33 is a high impact resistant thermoplastic elastomeric skin made from butadiene-styrene thermoplastic rubber and 34 is a high impact resistant polyurethane structural backing member.

FIG. 8 is a flow sheet of the process. It shows an illustrative embodiment of the process herein claimed. The text of the flow sheet is self-explanatory.

DESCRIPTION OF PREFERRED EMBODIMENTS

Plastisols illustrate an eminently suitable material to form the skin component of the articles of manufacture of this invention. Plastisols are well described in the literature, as e.g. in Modern Plastics 26, 78 (April 1949) by Perrone and Neuwirth. They are dispersions of finely divided polyvinyl resin powders in liquid organic plasticizers. The resins contain predominantly polyvinyl chloride with or without some other polymerized monomer. They are polymerized to a degree where they have very low solubility at room temperature. Therefore, instead of dissolving them, the plastisols contain the resins in a dispersed state; the dispersions are usually of creamy consistency at room temperature and are always fluid to a certain degree. A great variety of plasticizers can be used. Dioctyl phthalate is an example. Dioctyl adipate is another example, which frequently is used in admixture with dioctyl phthalate. Polyester plasticizers are also well known. The plastisols usually contain a stabilizer and may contain pigment, if so desired. For convenience and to achieve brevity, a few publications may be referred to, which all deal with plastisols, their formulation and application methods: (a) Geon Resin 121 in Plastisol Compounding, Service Bulletin PR–4, Revised October 1958, B. F. Goodrich Chemical Company. 24 pages. (b) The Vanderbilt News, vol. 26, No. 3, June 1960. R. T. Vanderbilt Company, Inc. Page 12. (c) Modern Plastics Encyclopedia Issue for 1961, published in September 1960. Vinyl polymers and copolymers. Pages 129 to 132. Plastisol Molding, pages 765 to 771. (d) Modern Plastics Encyclopedia 1965, (issued 1964). Vinyl Polymers and Copolymers, page 271. Plastisol Molding, page 690.

When molding plastisols, the material is heated to a gelling temperature and a gelled film or layer is formed which is very weak and cheesy, but which does not flow. Further heating is required to "fuse" the deposit, causing the resin to dissolve in the plasticizer and form a tough homogeneous resinous mass in which the powdered resin and liquid plasticizer have formed a single uniform phase. The fusion transforms the cheesy deposit or film to a tough leather-like homogeneous layer or skin.

With regard to temperatures required, these are well known in the art. They vary from composition to composition. They vary with time. There are, further, three types of temperatures involved: (1) oven temperature, (2) mold (die) temperature and (3) temperature of the plastisol. Gelation temperature may be accomplished by heating the oven from 150 to 600° F. and usually is between a plastisol temperature of 150 to 300° F. The necessary times vary with the temperature used. Fusion is accomplished by heating the gelled layer in ovens from about 350° F. to about 650° F. The achieved plastisol temperature for fusion should advantageously range from about 350° to 450° F.

The most useful molding methods for plastisol skins are illustrated by (a) slush molding, also called slush casting and (b) rotational molding, also called rotational casting. The expression "casting" is used because the plastisols are applied in fluid state and for this reason the operation has similarity to metallurgical casting. Seamless dies (molds) are preferred for the intermediate products of this invention. They can be readily utilized, even when complicated undercuts exists in the molds, as the skins produced from plastisols are flexible, elastic and have a "shape memory," i.e., they recover from their stretched position, obtained during removal, to the original molded shape.

When slush molding or slush casting is used, in the first step an excess of plastisol may be poured into the seamless mold. As the plastisol reaches gelation temperature the layer adjacent to the metal wall of the mold gels, i.e., solidifies. The thickness of the gelled well is determined by the duration of time the mold is exposed to the temperature of gelation. The excess plastisol is then removed by pouring off the liquid portion. Heating is then continued to complete the fusion and the molded skin is then removed or stripped from the mold. There are two methods known in slush molding: (i) One Pour Method, and (ii) Two Pour Method. Both are well known in the art and are applicable to make the skins of this invention from plastisols.

Rotational molding is another method of casting. The basic departure from slush molding is that, instead of an excess of the liquid plastisol, a premeasured quantity of the fluid is used when charging the mold. This eliminates the need for removing any excess. The charged fluid plastisol is then distributed evenly in the mold by rotating the same on a rotational molding machine. After the plastisol is properly distributed, it is gelled by the application of heat and finally fused. The completed skin is then stripped and removed from the mold.

Whereas the casting by slush molding or rotational molding is preferred to form the skins from plastisols, other methods known in the art may also be followed to achieve the same purpose. Spraying illustrates such other methods.

If elevated temperatures are used in stripping the plastisol skin from the mold, a temperature of 140° F. illustrates a suitable temperature.

FIG. 8, the flow sheet, illustrates suitable processes of this invention. A preferred sequence is:

Step 1: Casting fluid plastisol is a seamless mold suitable to form a hollow outer layer component having an access opening; alternative (a): by slush casting; alternative (b): by rotational casting (molding);

Step 2: Heating the plastisol to a sufficient temperature and for a sufficient time to cause gelation of the plastisol adjacent to the mold; in alternative (a) of Step 1, pouring off the excess liquid plastisol;

Step 3: Heating the mold and gelled plastisol to a temperature and for a time sufficient to fuse the gelled plastisol to a tough skin;

Step 4: Stripping the skin from the mold; alternative (i) at room temperature, alternative (ii) at suitable elevated temperature;

Step 5: Preparing the liquid thermosetting composition comprising the organic plastics binder which forms the structural backing member upon solidification; alternative (I): in absence of fillers, such as coarses; alterative (II): in the presence of fillers, such as coarses;

Step 6: Introducing the liquid composition prepared under Step 5 into the interior cavity of the hollow premolded outer layer (skin) component; alternative (I): using the premolded skin for molding the structural backing member component and substantially filling said interior cavity in one single step; alternative (II): using the premolded skin for molding the structural backing member component while casting the liquid composition prepared under Step 5 in repeated layers into the interior cavity of the premolded skin component (see Step 8); alternative (III): after placing the skin in a second mold;

Step 7: Elective: Providing for a reinforcing spine or incorporation of decorative objects (flowers, plants, feathers, etc.) while the structural backing member forming composition is still liquid;

Step 8: Solidifying the fluid structural backing member forming composition; (in alternative II of Step 6, solidification of each layer is preferred before the next layer is applied);

Step 9: Recovering composite article.

Rigid polyester resins and rigid epoxy resins are favored embodiments as binder resins for the structural backing member component. The expression "binder resin" is used in this specification and in the instant claims as a characteristic of the resins and does not mean necessarily the presence of pigments or fillers. Rigid polyester resins and rigid epoxy resins have been described in an earlier section of this specification. Examples P–E–2 and P–E–3 illustrate suitable polyester compositions. Example E–A–(ii) illustrates a suitable epoxy resin composition.

Example P–E–2.—Rigid polyester for structural backing member component

A rigid polyester slush casting composition is prepared by mixing 41.43% of Laminac Polyester Resin 4128, 0.10% cobalt naphthenate (6% Co), 41.34% of 325 mesh silica (flint), 16.53% of 60 mesh silica (flint), and 0.69% MEK peroxide, totaling 100%. The ingredients are mixed in the order of listing. The setting time of this filled polyester composition can be varied by changing the proportions of the catalyst (MEK peroxide) and cobalt metal content. The polyester resin used in this example gels at room temperature in absence of fillers in time intervals ranging from about 10 minutes with 1% catalyst and 0.3% cobalt naphthenate (6% metal content), to about 180 minutes with 0.5% catalyst and absence of cobalt naphthenate. In these gelling tests the MEK peroxide is applied as catalyst in 60% solution. The setting time of the filled composition of this example may be varied from about 4 minutes to about several hours at room temperature.

Example P–E–3.—Rigid polyester composition for structural backing member component, suitable with fiberglass reinforcement A composition suitable for use with fiberglass reinforcement has the following weight parts: Laminac Polyester Resin 4128 100 parts, cobalt naphthenate (6% metal content) 0.2 part, 325 mesh silica 100 parts and MEK peroxide 1 part, totaling 201.2 parts. This composition sets in about one half hour. By varying the quantities and proportions of the catalyst and accelerator the speed of setting can be changed and regulated. Increased ambient temperature accelerates setting time.

Example E–R–(ii).—Epoxy resin composition for structural backing member component A suitable composition has the following weight parts: Epon Resin 828 100 parts, Epoxide #7 (Procter & Gamble) 5 parts, 325 mesh silica 100 parts, 60 mesh silica 100 parts, diethylenetriamine 10 parts, totaling 315 parts. A small quantity of Cab-O-Sil can be added to regulate viscosity and drainage time. This additive increases viscosity and decreases drainage time on vertical surfaces. The composition of this example is suitable for fiberglass reinforced applications.

The rigid polyesters are preferred over the rigid epoxy resins as the resin component of the structural backing member component. Polyesters cure at faster rates than epoxy resins and therefore permit faster production schedules. The structural backing member component may advantageously be reinforced by fibrous materials. Fiberglass illustrates such fibrous materials.

Fiberglass reinforcements are supplied as continuous strands, fabrics, mats, chopped strands, and other forms. Other useful fibrous reinforcements may include sisal, cotton, jute, asbestos, synthetic fibers and metallic fibers, amongst others. In producing smaller objects, individual fibers or chopped strands are preferred, as the application of mats, i.e., would require larger access openings in the outer shell component than what is available in small objects.

The resinous composition forming the structural backing member component may be applied by various suitable methods. The application is from a liquid state. Casting or spraying are examples of suitable methods. However, other methods may also be used. The internal cavity of the hollow premolded shell component (outer layer component) can be filled by the liquid resinous compositions in one step fully or in installments, that is, in several layers. The viscosity of the liquid composition is adjusted by formulation to supply the required degree of flow and drainage properties desirable for the particular application method selected.

In one illustrative method, using fiberglass reinforcement chopped strands are preimpregnated with the resinous composition and jointly applied. This requires the dispersion of the chopped strands in the resinous composition.

What is stated above for rigid polyester compositions applies also for rigid epoxy resin compositions. The former are preferred because of their faster setting and curing time, particularly where fibrous reinforcement is also utilized. Combinations and modifications of the above outlined illustrative methods are used where special circumstances require such changes.

Whereas unfilled rigid polyester and epoxy resins can be used to form the structural backing member component according to this invention, filled compositions are preferred. The fillers reduce shrinkage during curing and have other additional advantages. Silica (flint) illustrates a suitable filler. 325 and 60 mesh qualities are presented in the illustrative examples. When 60 mesh silica is used, the composition may require the use of a special type of spray gun, on account of the large particle size of some of the filler particles.

The rigid polyesters, particularly, and to a lesser extent the rigid epoxy resins of the structural backing member component, may show limited adhesion to some of the outer shell components. In an embodiment of this invention, therefore, an adhesive is applied as an intermediary layer between the shell component and the structural backing member component. Suitable adhesives will be discussed further below.

The rigid polyester and rigid epoxy resin structural backing member components, per se, are somewhat brittle. They are well protected on one side by the pliable outer shell components. Their toughness is improved by fibrous reinforcement.

In many instances, as it was stated above, it is advantageous to apply an adhesive as an intermediate layer between the outer shell component and the structural backing member component. This is particularly true when the outer shell component is derived from plastisol and the structural backing member component comprises a rigid polyester resin.

Neoprene cement illustrates a suitable adhesive. Columbia Cement Company's Neoprene Cement #742 illustrates this group. I have applied it in a diluted solution form, using 20% of Cement #742 and 80% methylethyl ketone, proportions by weight. This solution was applied by slush casting to the interior surface of a premolded plastisol shell through its access opening and air dried. This was followed by the application of the resinous composition of Example P–E–2.

For individual purposes suitable adhesives may be selected from the group of hot asphalt adhesives, resorcinol adhesives, rubber emulsions, rubber solutions, (cements), epoxy resins, special polyester resins, latex, latex modified cements, amongst others.

Other adhesives suitable for individual purposes are:
(1) Solutions of Vinylite Resin VAGH in solvents, as in methylethyl ketone, or in mixtures of toluene and methylethyl ketone. This is a copolymer of vinyl acetate, vinyl chloride and vinyl alcohol, and is compatible with alkyd resins and polyesters. (2) Polyurethane adhesives of the 2 part and 1 part systems. (3) An adhesive containing vinyl resins, methylethyl ketone, dioctyl phthalate and methylene-bis(4-phenyl isocyanate). (4) Nitrile rubber adhesives. (5) Nitrile-phenolic adhesives as discussed on page 490, col. 2, par. 6 of Handbook of Adhesives, by Irving Skeist, Reinhold Publishing Corp., 1962/64. See also pages 236 to 241 of same publication.

According to one embodiment of this invention, improved adhesion can be achieved by the application of a joint "contact resin" ingredient being simultaneously present in the outer shell component and the structural backing member component. This contact resin is compatible with the composition of both components and its simultaneous presence promotes the adhesion of the two components, thereby eliminating the need for a special adhesive layer placed between them. A peracetic epoxy resin is a suitable illustration. Bakelite Epoxy Resin ERL–4289 is bis(4,4 - epoxy-6-methylcyclohexylmethyl) adipate. In one step 20 phr. (parts per hundred resin) of this peracetic epoxy resin is incorporated into the plastisol composition and borontrifluoride monoethylamine is added thereto in a proportion of 2% additive based on the weight of the epoxy resin. This plastisol compound is then molded at about 275° F. for a time sufficient to gel, but not to fuse the plastisol. The mold is opened and the rigid polyester forming composition is applied. The polyester composition contains about 10% of the peracetic epoxy resin ERL–4289 based on the weight of the polyester resin. The curing is then continued to complete the fusion of the plastisol component and the setting and polymerization of the rigid polyester containing structural backing member component. This process results in a satisfactory adhesion between the two components, however, it is not suitable for shells which have undercuts that make removal from the mold difficult after rigidification.

In some cases an ancillary reinforcing element may be present in the structural backing member component to assist in further strengthening the composite article. Such reinforcing element may be of metal, paper chipboard, cardboard or similar elements used in the art.

Catalysts or curing agents for polyurethanes include propyleneglycol monoricinoleate, polypropyleneglycols of 400 to 450 molecular weight, triethylamine, n-methyl morpholine, ricinoleyl alcohol, trimethylpropane (TMP), in addition to those listed earlier. p,p'-Methylene bis-(orthochloroaniline) is particularly adaptable to room temperature cures.

Thiokol-compatible catalysts active on Epoxy/Thiokol systems are illustrated by dimethylaminomethyl phenol (mixtures of the ortho and para compounds), 2,4,6-tri-(dimethylaminomethyl) phenol, benzyl dimethylamine, alpha-methylbenzyldimethylamine, m - phenylenediamine, 4,4'-methylenedianiline.

Suitable fillers are members of the groupings of aluminum silicates, asbestos, barium sulfate, calcium carbonate, graphite, lithium aluminum silicate, magnesium silicates, mica, milled glass fibers, portland cement powder, sand, silica, slate flour and quartz.

The composite articles of manufacture of this invention are dense, tough, solid, impact-resistant and three-dimensional. They could be called essentially rigid. Whereas those comprising rigid polymers, as responsible for the structural backing member component, are rigid, those comprising filled elastomers may permit a slight temporary indentation by applied hand pressure to the outer layer component's outer surface. The application of the structural backing member component in all cases substantially reduces the pliability of the outer layer component.

I claim:

1. The process of preparing composite, dense, tough, impact-resistant, solid substantially cavity-free three-dimensional rigid articles of manufacture, wherein in the first step a hollow, plastics outer layer component of the desired shape is molded from a pliable plastics material in such a manner that it has an access opening to its interior cavity, removing in an subsequent step the premolded outer layer component from its mold, preparing in a separate step a liquid composition comprising a thermo-setting organic plastics binder, introducing said liquid composition into the interior cavity of the premolded hollow outer layer component through its access opening, solidifying and subsequently thermosetting the liquid composition thereby forming a solid and rigid structural backing member component in the cavity of the outer layer component and recovering the composite article so produced, the introduction and solidification of the said liquid composition being carried out in a manner to substantially fill said cavity and to have contact between the rigid structural backing member and the entire area of the inner walls of the outer layer component.

2. The process of claim 1, wherein the liquid composition contains fillers as additional ingredients.

3. The process of claim 1, wherein the solidification of the liquid composition is carried out at ambient temperatures.

4. The process of claim 1, wherein the premolded outer layer component is used as the sole mold during the formation of the solidification step which yields the structural backing member component.

5. The process of claim 1, wherein the premolded outer layer component is placed into a second mold prior to and during the solidification step yielding the structural backing member component.

6. The process of claim 1, wherein the structural backing member component is formed by casting and setting the liquid composition in layers.

7. The process of claim 1, wherein the first step is carried out in a manner to yield an outer layer component having a thickness of from about 15 mils to about 250 mils.

8. The process of claim 1, wherein the liquid composition forming the structural backing member component comprises a polyester resin as the thermosetting organic plastics binder.

9. The process of claim 1, wherein the liquid composition forming the structural backing member component comprises an epoxy resin as the thermosetting organic plastics binder.

10. The process of claim 1, wherein the liquid composition forming the structural backing member component comprises a polysulfide rubber as the thermosetting organic plastics binder.

11. The process of claim 1, wherein the liquid composition forming the structural backing member component comprises a depolymerized rubber as the thermosetting organic plastics binder.

12. The process of claim 1, wherein the liquid composition forming the structural backing member component comprises a polyurethane resin as the thermosetting organic plastics binder.

13. The process of claim 1, wherein the liquid composition comprises sand.

14. The process of claim 1, wherein the first step is carried out in a manner that the molded outer layer component shall comprise a member of the class consisting of (a) plastisol, (b) polyethylene, (c) rubber.

15. The process of claim 1, wherein the first step is carried out in a manner that the outer layer component comprises vinylchloride in a polymerized and plasticized state.

16. The process of claim 1, wherein there is present as an additional component a reinforcing spine embedded in the structural backing member component.

17. The process of claim 1, wherein a decorative object is embedded in the rigid structural backing member component as an additional component.

18. A method for forming a composite, rigid, dense, tough, impact-resistant, solid, substantially cavity-free three-dimensional article of manufacture comprising the steps of casting a liquid plastisol material in a hollow, seamless mold, heating the cast layer of plastisol to gel the layer of plastisol next to the mold, heating the gelled layer of plastisol, while in a mold, to a temperature sufficient to fuse the gelled plastisol and to form an outer plastisol skin component having a preset shape defined by the shape of the mold and having an internal cavity with an access opening to said cavity, removing said skin from said mold, preparing in a separate step a liquid composition comprising a thermosetting organic plastics binder being capable to be transformed into a dense and tough thermoset solid, casting said liquid composition into the internal cavity of the preset outer skin component in a manner to fill substantially completely the internal cavity of the skin component, solidifying and thermosetting the said liquid composition to a structural backing member component in intimate contact with the entire inner surface of said skin, and recovering the resulting molded composition.

References Cited
UNITED STATES PATENTS

| | | | |
|---|---|---|---|
| 3,420,729 | 1/1969 | Roberts | 264—302 |
| 3,405,026 | 10/1968 | Roberts | 264—45 |
| 2,424,869 | 7/1947 | Wedger | 264—244 |
| 3,071,817 | 1/1963 | Laporte | 264—302 |
| 2,974,373 | 3/1961 | Streed et al. | |
| 2,939,180 | 6/1960 | Hickler et al. | 264—302 |
| 3,198,864 | 8/1965 | Bingham | 264—250 |

ROBERT F. WHITE, Primary Examiner

R. H. SHEAR, Assistant Examiner

U.S. Cl. X.R.

264—302